Patented July 9, 1940

2,207,193

UNITED STATES PATENT OFFICE 2,207,193

PRODUCTION OF ALLYL TYPE HALIDES

Herbert P. A. Groll, Hamburg-Wellingsbuttel, Germany, assignor to Shell Development Company, San Francisco, Calif., a corporation of Delaware No Drawing. Application September 14, 1937, Serial No. 163,822

10 Claim. (Cl. 260—654)

The present invention relates to a process for the production of hydrolizable allyl type halides by the pyrolytic removal of the elements of hydrogen halide from propylene polyhalides, and has particular reference to the production of allyl chloride from propylene chloride.

Since propylene chloride can be produced cheaply in abundance and is, moreover, produced as a by-product in various chlorination processes, there is a great demand for a method whereby this inexpensive material can be converted economically to the valuable allyl chloride.

According to U. S. Patent No. 1,477,047, allyl chloride may be produced in a yield amounting to 66% by passing propylene chloride over calcium chloride at a temperature of 350° C. The reaction of the process is stated to be also catalyzed by other dehydrohalogenation catalysts such as $BaCl_2$, but to a lesser extent. In spite of numerous trials, using varied conditions within the limits specified in said Letters Patent, I have been unable to produce any substantial quantity of allyl chloride by this method. Clebansky and Volkenstein, (J. Appl. Chem. U. S. S. R. 8, 106 (1935) in a thorough investigation of the subject, have also found that the product under these conditions is not allyl chloride but alpha-chloropropylene with some allene and allylene as by-products.

Continuing my investigation of this problem, I have discovered a practical method whereby allyl type halides may be produced from propylene polyhalides in a substantial yield.

According to the present invention, the elements of hydrogen halide are caused to be removed from a propylene polyhalide by subjecting said propylene polyhalide to a temperature of 450° C. or higher to form an allyl type halide as the predominant product.

The reaction, which is presumably one of surface pyrolysis, may be carried out in any one of the usual types or assembly of apparatus customarily used for this type of reaction. One suitable and convenient method of accomplishing the purpose is to pass the propylene polyhalide through a tube or tubes maintained at the desired temperature.

The dehydrohalogenation reaction, as it proceeds in the temperature range of the present invention, was found to be primarily non-catalytic, as is evidenced by the relative uniformity of the results when the reaction is made to proceed in the presence of widely different materials. Thus, for example, unpacked tubes of glass, quartz, carbon and steel (known to the trade as KA2 steel) have been found to be equally suitable.

While unpacked tubes are suitable and have the advantage of not being easily plugged, I may also use tubes filled with a suitable packing material. The use of such packed tubes has the advantage of offering a larger surface on which pyrolysis may occur, and the advantage of promoting more uniform temperature conditions, but carries the disadvantage of being more easily plugged with decomposition products. Any material, inert under operating conditions, such as presents a suitable surface may be used, if desired, as a tube packing. For example, pumice, carbon chips, glass wool, porcelain chips, calcium chloride, clay chips, etc., have been found to be equally satisfactory. I have found that the use of the usual dehydrohalogenation catalyst, such as $CaCl_2$ or $BaCl_2$, as a tube packing does not offer any advantage over the other above-mentioned materials, since the small amount of carbon and other decomposition products which invariably accompany the pyrolysis reaction, quickly kill any catalytic action which might be possessed by these substances.

Under the conditions of operation herein set forth, the product formed from propylene chloride is found to consist not predominantly of alpha-chloropropylene, but a mixture of all the theoretically possible unsaturated mono-chlorides formed by the removal of one mol of HCl from the dichloride, as well as some allene and allylene formed by the removal of two mol HCl, in which mixture allyl chloride is the predominant constituent. For example, the products from a number of experiments had the following compositions, based on the unsaturated monochlorides formed:

| | Per cent |
|---|---|
| Allyl chloride | 58–80 |
| Alpha-chloropropylene | 20–42 |
| Beta-chloropropylene | Less than 5 |

Experiments have shown that of the possible unsaturated monochlorides, the desired product, allyl chloride, is the least heat stable. Therefore, in order to procure optimum yields, I execute the invention in such a manner as to eliminate as far as possible any further reaction of the once formed allyl chloride. I accomplish this by maintaining the temperature and reaction time (the severity of the pyrolysis conditions) within certain limits.

If propylene chloride is caused to pass through a tube maintained at a sufficiently high temperature, it is found that the amount of dehydrohalogenation reaction taking place is dependent upon the temperature and the time of reaction. I find it therefore convenient to express the severity of the conditions (temperature and reaction time), in terms of the amount of propylene chloride reacted per pass, which amount I designate as "conversion per pass." I have found, disregarding factors of minor import, that the yield of allyl chloride, based on the propylene chloride consumed, is increased as the conversion per pass is decreased, reaching a practical maximum of yield when the conversion per pass is about 18%. In general, conversions per pass not greater than about 40% are preferred, although higher conversions per pass may give a greater output and may, therefore, be economical in some cases.

The low coversions per pass detract very little from the value of the invention, since it is a simple matter to recycle the unreacted dichloride after distilling off the monochloride fraction.

Since the yields are largely dependent upon the conversion per pass, which is a function of the reaction time as well as the temperature, it is obvious that an optimum temperature cannot be stated. Thus, for example, equally satisfactory results have been obtained using temperatures of 500°, 550°, 600° and 700° C., in which cases the reaction times were approximately 10, 7, 3 and 1 seconds, respectively. The invention is, however, always executed at a temperature at least sufficient to cause an appreciable removal of hydrogen halide from the polyhalide without the aid of a dehydrohalogenation catalyst. Thus, the minimum temperature at which the present invention may be executed is, in the case of propylene chloride, at about 450° C.

If desired, in order to insure a more uniform temperature or as a means of shortening the reaction time, the reaction may be made to proceed in the presence of an inert gas, such as nitrogen or carbon dioxide.

While the use of subatmospheric pressure may facilitate the splitting off of hydrogen halide and therefore allow slightly lower temperature, the invention is more conveniently executed at or near atmospheric pressure.

I have found that impurities in the propylene polyhalide do not generally effect the efficiency of the process. Thus, for example, propylene chloride fractions of considerable boiling range from various sources, such as the low temperature chlorination of propylene, the high temperature chlorination of propylene and the chlorination of propane may be used. Other more highly chlorinated products of propylene such as 1,1,2-trichlorpropane, 1,2,2-trichlorpropane and 1,2,3-trichlorpropane may be dehydrohalogenated in the manner heretofore described to give allyl type chlorides. It is also to be understood that while I have particularly stressed the chlorides, the other halides of propylene are also applicable.

The following example sets forth one of the various ways in which the principle of my invention may be utilized. Said example is purely illustrative and is not to be construed as a limitation on the invention.

Example

Propylene chloride was vaporized in a steam heated vaporizer at a constant rate of 10.7 lbs. per hour. The vapor was passed directly through 10 ft. of 2 in. KA steel tubing kept at a temperature of about 510° C. The effluent gaseous mixture was passed through a water-cooled coil to condense the monochlorpropylenes as well as the unreacted propylene chloride. The uncondensed gases were scrubbed with water to remove hydrogen chloride therefrom. The condensed mixture was then carefully fractionated, and the unreacted propylene chloride returned to be retreated. The monochloride fraction was found to consist of about 63.6% allyl chloride, and about 34.4% of a mixture of alpha chloropropylene and beta chloropropylene. The conversion per pass in this experiment was about 17.8%, and the yield of allyl chloride, based on the amount of propylene chloride consumed was about 58 mol percent.

The dependence of the yield on the conversion per pass is shown in the following table (Table I) in which the above example is designated as Experiment 1:

Table I

| Experiment | Conversion/pass | Yield of allyl chloride |
|---|---|---|
| | Percent | Percent |
| 1 | 17.8 | 58.0 |
| 2 | 33.0 | 41.6 |
| 3 | 53.0 | 34.3 |
| 4 | 73.3 | 18.0 |

These experiments were all made using unpacked KA2 steel tubes.

The interdependence of the temperature and reaction time is shown in the following Table II:

Table II

| Temperature | Reaction time (approx.) | Yield of allyl chloride |
|---|---|---|
| | Seconds | Percent |
| 550° C | 6.5 | 42.4 |
| 600° C | 2.6 | 45.3 |
| 700° C | 0.68 | 42.3 |

These experiments were made in an unpacked quartz tube at a conversion per pass of about 30%.

From the foregoing, it is seen that by raising the temperature sufficiently to cause pyrolysis to take place without the aid of dehydrohalogenation catalysts and properly adjusting the conditions of the reaction, a process results which differs essentially from the hitherto proposed methods.

While I have in the foregoing described in some detail the preferred embodiments of my invention and some variants thereof, it is to be understood that I do not desire my invention to be limited to the details of operation herein described, nor by the soundness or accuracy of theories which I have advanced as to the advantageous results obtained. On the other hand, it is my intention to claim all novelty herein disclosed as broadly as possible in view of the prior art.

I claim as my invention:

1. A process for the production of an allylic halogen-containing propene by the dehydrohalogenation of a polyhalopropane, which comprises subjecting the vapors of a polyhalopropane of the group consisting of the 1,2-dihalopropanes, the 1,1,2-trihalopropanes, the 1,2,2-trihalopropanes, and the 1,2,3-trihalopropanes, to a temperature above 450° C. but below that at which excessive rupture of the carbon-carbon bonds occurs.

2. A process for the production of an allylic halogen-containing propene by the dehydrohalogenation of a polyhalopropane, which comprises subjecting the vapors of a polyhalopropane of the group consisting of the 1,2-dihalopropanes, the 1,1,2-trihalopropanes, the 1,2,2-trihalopropanes, and the 1,2,3-trihalopropanes to a temperature above 450° C. but below that at which excessive rupture of the carbon-carbon bonds occurs for a length of time sufficient to dehydrohalogenate not more than about 40 percent of said polyhalopropane.

3. A process for the production of an allyl halide by the dehydrohalogenation of a 1,2-dihalopropane, which comprises subjecting the vapors of the 1,2-dihalopropane to a temperature above 450° C. but below that at which excessive rupture of the carbon-carbon bonds occurs.

4. A process for the production of an allyl halide by the dehydrohalogenation of a 1,2-dihalopropane, which comprises subjecting the vapors of the 1,2-dihalopropane to a temperature above 450° C. but below that at which excessive rupture of the carbon-carbon bonds occurs for a length of time sufficient to dehydrohalogenate not more than about 40 per cent of said 1,2-dihalopropane.

5. A process for the production of an allylic chlorine-containing propene by the dehydrohalogenation of a polychloropropane, which comprises subjecting the vapors of a polychloropropane of the group consisting of 1,2-dichloropropane, 1,1,2-trichloropropane, 1,2,2-trichloropropane, and 1,2,3,-trichloropropane to a temperature above 450° C. but below that at which excessive rupture of the carbon-carbon bonds occurs.

6. A process for the production of an allylic chlorine-containing propene by the dehydrohalogenation of a polychloropropane, which comprises subjecting the vapors of a polychloropropane of the group consisting of 1,2-dichloropropane, 1,1,2-trichloropropane, 1,2,2-trichloropropane, and 1,2,3-trichloropropane to a temperature above 450° C. but below that at which excessive rupture of the carbon-carbon bonds occurs for a length of time sufficient to dehydrohalogenate not more than about 40 percent of said polychloropropane.

7. A process for the production of allyl chloride by the dehydrohalogenation of propylene chloride which comprises subjecting the vapors of the propylene chloride to a temperature above 450° C. but below that at which excessive rupture of the carbon-carbon bonds occurs.

8. A process for the production of allyl chloride by the dehydrohalogenation of propylene chloride which comprises subjecting the vapors of the propylene chloride to a temperature above 450° C. but below that at which excessive rupture of the carbon-carbon bonds occurs for a length of time sufficient to dehydrohalogenate not more than about 40 percent of said propylene chloride.

9. A process for the production of allyl chloride which comprises subjecting the vapors of a crude dichloropropane fraction obtained from the product of the chlorination of propane, to a temperature above 450° C. but below that at which excessive rupture of the carbon-carbon bonds occurs, for a length of time sufficient to dehydrohalogenate not more than about 40% of said dichloropropane fraction.

10. The method which comprises pyrolyzing propylene chloride at a temperature above 450° C., but below that at which excessive carbonization occurs and thereafter isolating allyl chloride from the reacted mixture.

HERBERT P. A. GROLL.